US008735804B2

(12) United States Patent
Oriol et al.

(10) Patent No.: US 8,735,804 B2
(45) Date of Patent: May 27, 2014

(54) DEVICE FOR ONLINE MEASUREMENT OF A FLOW OF FAST AND EPITHERMAL NEUTRONS

(75) Inventors: Ludovic Oriol, Pertuis (FR); Bernard Lescop, Saint Michel sur Orge (FR); Ludo Vermeeren, Aarschot (BE)

(73) Assignees: Commissariat a l'Energie Atomique et aux Energies Alternatives, Paris (FR); SCK.CEN, Brussels (BE)

( * ) Notice: Subject to any disclaimer, the term of this patent is extended or adjusted under 35 U.S.C. 154(b) by 619 days.

(21) Appl. No.: 13/123,880

(22) PCT Filed: Oct. 9, 2009

(86) PCT No.: PCT/EP2009/063146
§ 371 (c)(1),
(2), (4) Date: May 25, 2011

(87) PCT Pub. No.: WO2010/043554
PCT Pub. Date: Apr. 22, 2010

(65) Prior Publication Data
US 2011/0274230 A1    Nov. 10, 2011

(30) Foreign Application Priority Data
Oct. 13, 2008  (FR) ...................................... 08 56922

(51) Int. Cl.
*G01V 5/10* (2006.01)
(52) U.S. Cl.
USPC ..................................... 250/269.5; 250/269.4
(58) Field of Classification Search
USPC .......................................... 250/269.5, 269.4
See application file for complete search history.

(56) References Cited

U.S. PATENT DOCUMENTS

| 3,752,735 | A | | 8/1973 | Musick et al. | |
|---|---|---|---|---|---|
| 4,180,730 | A | * | 12/1979 | Givens et al. | 250/265 |
| 4,379,228 | A | * | 4/1983 | Allen | 250/266 |
| 4,524,274 | A | * | 6/1985 | Scott | 250/269.4 |
| 5,536,938 | A | * | 7/1996 | Mills et al. | 250/269.4 |
| 5,684,299 | A | * | 11/1997 | DasGupta | 250/269.2 |
| 2003/0178560 | A1 | * | 9/2003 | Odom et al. | 250/269.2 |
| 2004/0222368 | A1 | * | 11/2004 | Odom et al. | 250/269.2 |
| 2009/0045328 | A1 | * | 2/2009 | Fricke et al. | 250/269.4 |

FOREIGN PATENT DOCUMENTS

| FR | 2727526 | 5/1996 |
|---|---|---|
| FR | 2925750 | 6/2009 |

OTHER PUBLICATIONS

International Search Report and Written Opinion in PCT/EP2009/063146, mailed Nov. 5, 2009.

(Continued)

*Primary Examiner* — Christine Sung
(74) *Attorney, Agent, or Firm* — Nixon Peabody LLP

(57) ABSTRACT

A device for online measurement of a flow of fast and epithermal neutrons. The device has
  a fast and epithermal neutron detector (DNR) able to detect principally fast and epithermal neutrons;
  a thermal neutron detector (DNT) able to detect principally thermal neutrons;
  a first circuit (C1) for processing the signal delivered by the fast neutron detector;
  a second circuit (C2) for processing the signal delivered by the thermal neutron detector;
  a means (CE, PMM) suitable for determining the progressive sensitivity to the fast neutrons and to the thermal neutrons of each of the neutron detectors, and
  a computer (CALC) which computes the flow of fast and epithermal neutrons on the basis of the said progressive sensitivities and of the signals delivered by the first and second processing circuits.

20 Claims, 6 Drawing Sheets

(56) References Cited

OTHER PUBLICATIONS

French Search Report in French Application No. FR 0856922, dated Aug. 4, 2009.
Almaviva, S. et al., "Thermal and Fast Neutron Detection in Chemical Vapor Deposition Single-Crystal Diamond Detectors," Journal of Applied Physics, vol. 103, Mar. 2008, pp. 54501-1-54501-6.
McGregor, D. S. et al., "Micro-Pocket Fission Detectors (MPFD) for In-Core Neutron Flux Monitoring," Nuclear Instruments and Methods in Physics Research A, vol. 554, Dec. 2005, pp. 494-499.
Ishikawa, M. et al., "Development of a Wide-Range Paired Scintillator With Optical Fiber Neutron Monitor for BNCT Irradiation Field Study," Nuclear Instruments and Methods in Physics Research A, vol. 551, Oct. 2005, pp. 448-457.
Filliatre, P. et al., "Reasons Why Plutonium 242 is the Best Fission Chamber Deposit to Monitor the Fast Component of a High Neutron Flux," Nuclear Instruments and Methods in Physics Research A, vol. 593, Aug. 2008, pp. 510-518.
Beretz, D. et al., "French PWR Vessel Surveillance Program Dosimetry: Experience Feedback From More Than a Hundred Capsules", Reactor Dosimetry: Radiation Metrology and Assessment, ASTM STP 1398, 2001, pp. 29-37.
Kashchuk, Y. A. et al., "Monitoring the Fast-Neutron Flux Density and Fluence in a RBMK Core Using a Threshold Fission Chamber in a Screen-Absorber," Atomic Energy, vol. 98, No. 4, 2005, pp. 249-255.
Knoll, G. F., "Radiation Detection and Measurement," 3rd Edition, John Wiley & Sons, 1999, 7 pages.
Tsilanizara, A. et al., "Darwin: An Evolution Code System for a Large Range of Applications," Journal of Nuclear Science and Technology, Supplement 1, Mar. 2000, pp. 845-849.
Vermeeren, L., "Absolute On-line In-pile Measurement of Neutron Fluxes Using Self-Powered Neutron Detectors: Monte Carlo Sensitivity Calculations," RRFM 2001, 5th International Topical Meeting on Research Reactor Fuel Management, Eurogress Aachen, Germany, Apr. 1-3, 2001, pp. 61-65.

* cited by examiner

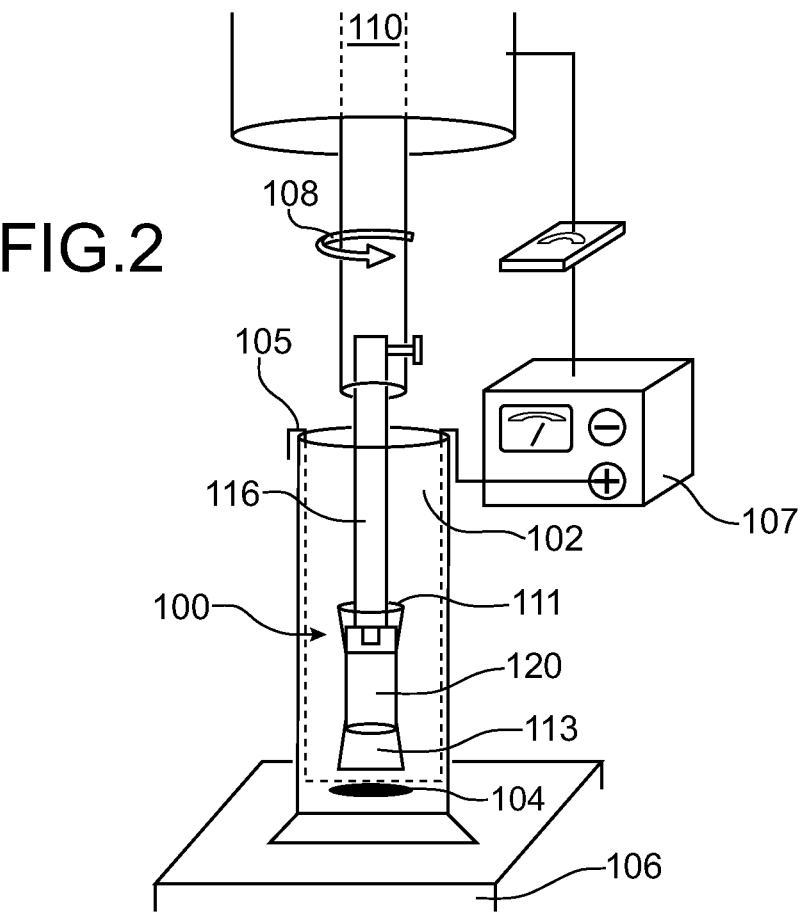

DEVICE FOR ONLINE MEASUREMENT OF A FLOW OF FAST AND EPITHERMAL NEUTRONS

CROSS REFERENCE TO RELATED APPLICATIONS OR PRIORITY CLAIM

This application is a National Phase of PCT/EP2009/063146, filed Oct. 9, 2009, entitled, "DEVICE FOR THE INLINE MEASUREMENT OF RAPID EPITHERMAL NEUTRONS", and which claims priority of French Patent Application No. 08 56922, filed Oct. 13, 2008.

TECHNICAL FIELD AND PRIOR ART

The present invention concerns a device for online measurement of a flow of fast and epithermal neutrons over an energy interval $[E_{min}, E_{max}]$.

As a non-restrictive example, the invention applies particularly advantageously to the online measurement of a flow of fast and epithermal neutrons in a reactor core, with the following constraints:

the global neutron flow is high (for example 1E14 $n/cm^2/s$ or more);

the contribution of the thermal neutrons to the global neutron flow is substantial;

the gamma radiation is intense;

an (online) real-time measurement is desired to monitor the changes over time in the fast flow;

a measurement made in the core, more commonly called an "in-core" measurement, is desired.

The constraints mentioned above apply to the instrumentation in the material testing reactor, more generally designated by the term MTR ("Material Testing Reactor") instrumentation, or to the supervision of the power reactor cores (more generally designated by the term ""in-core" supervision").

The measurement of the fast neutron flow is currently made using two categories of detector: detectors by activation and online detectors.

Detectors by activation are dosimeters the materials of which are suitably chosen to supply the neutron fluence in an energy band of interest. This is a tried and tested method (cf. reference [1]), the disadvantages of which are as follows:

the dosimeters must be removed from the core in order to be analysed (this is therefore a post-event measurement available after the end of the reactor cycle);

the quantity obtained is the flow integrated over the duration of the irradiation, and it is therefore not possible to obtain the changes over time.

Online detectors, unlike the previous detectors, allow online measurement in the core of the reactor. According to known art, online detectors are uranium fission chambers under a thermal neutron absorbing screen. Fission chambers are well-known and very widespread neutron detectors for the neutron monitoring of the reactors ("ex-core" or "in-core" detectors). Certain chambers, which are called miniature or sub-miniature, have the external form of a cylinder of diameter 4 mm or less, which means that they are particularly well suited to "in-core" instrumentation which is the field covered in the present patent application. The French patent application filed in the name of the "Commissariat à l'Energie Atomique" on Nov. 29, 1994 and published as number 2 727 526 (cf. reference [2]) gives a detailed description of such a fission chamber. Neutrons are detected through a fissile deposit which is where the nuclear fission reactions take place. In a very large majority of cases, this deposit consists of uranium U235, which is well-suited for the measurement of thermal neutrons or for the measurement of fast neutrons in the absence of a thermal component. For the measurement of the fast neutrons with the constraints set out above, the use of uranium U238, for which the effective fission section has a threshold, is, in principle, preferentially indicated. However, a difficulty arises: under the effect of the captures of the thermal neutrons, the uranium U238 is transmuted into plutonium Pu239, a fissile isotope for the thermal neutrons. To overcome this difficulty, Y. Kashchuk et al. (cf. reference [3]) have recommended the use of screens (B10, Cd, Gd, etc.), the role of which is to absorb the thermal neutrons before they reach the detector itself. This solution, however, raises major difficulties: encumbrance, which is difficult to make compatible with "in-core" use, local disruption of the thermal flow, mechanical properties, wear and tear under the effect of the irradiation, heating of the detector.

Another type of online detector is known to the Applicant. This other type of online detector is a prior art which is described in a French patent application which has not yet been published, filed by the Applicant on 21 Dec. 2007 as national registration number 07 60229. This other type of detector consists of a fission chamber containing plutonium Pu242 which is pure to at least 99.5%. FIGS. 1A and 1B represent two examples of such a fission chamber, and FIG. 2 represents a device suitable for depositing plutonium Pu242 in these fission chambers. The advantage of such a fission chamber is that it meets the previously defined requirements without using any thermal neutron screen.

FIG. 1A represents a first example of a fission chamber containing plutonium Pu242 pure to at least 99.5%. In terms of mechanical structure, this fission chamber is identical to the one described in the patent application published as number 2 727 526.

Reference 20 designates a tube, of external diameter roughly equal, for example, to 1.5 mm, and which is used at once as a casing for the fission chamber and, in respect at least of a part designated by reference 21, as a cathode. This tube is made, for example, of Inconel or of stainless steel.

Inside the chamber, two isolators 22, 24, made for example of ruby, support a central anode 26 covered with a threshold fissile deposit, for example plutonium Pu242, the purity percentage of which is at least equal to 99.5%.

The tube 20 is closed at one of its ends 23 by an end cap 28, for example made of stainless steel. During its use, the chamber is filled with a neutral gas, for example argon or argon supplemented with a small nitrogen content (for example, 4%), at a pressure of a few bars (for example, 5 bars), and the end cap 28 is used for both filling and sealing the chamber. The anode 26 is connected to conducting elements 32, 36 to transmit an electrical signal to the outside of the chamber. These conducting elements 32, 36 are themselves connected to the conducting element 44 of a connecting cable 11 which connects the assembly to a connection device, as is described in patent application 2 727 526.

The conductor 32 is connected to the end 35 of the conductor 36, inside the tube 20 which defines the fission chamber, whereas the other end 37 of the conductor 36 which traverses the end cap 34, made of aluminium of great purity, is connected to the conductor 44 inside the extension of the outer metal sheath 30 of the cable 11. The end cap 34 is crimped, at least partly, in a metal duct 38 which can be welded on to the end 40 of the tube 20.

FIG. 1B represents a second example of a fission chamber containing plutonium Pu242 pure to at least 99.5%.

It includes a chamber body 1, made of an electrically conducting material, which is the outside casing of the device.

The enclosure can also be made from another material entirely, and a layer of electrically conducting material can be deposited on the inside of the walls of the enclosure to form the outer electrode 1. Means 2, which are also made from an electrically conducting material, form a support, on which is deposited a fine layer 120 of a radioelement, namely, in accordance with the present invention, plutonium 242 of purity of at least 99.5%. In operation these means 2 will form, for example, an anode, and the body 1 will form a cathode. Between the cathode and anode an ionisable gas will be contained, for example argon at 1.5 bar.

An airtight passage 3 (metal and alumina) holds the substrate 2 and allows the electrical connection to the outside, whilst ensuring that one end of the chamber is airtight.

A screw 4 enables the substrate to be locked on the airtight passage.

Reference 5 designates an end cap, and reference 6 an additional thickness welded on to the wire of the airtight passage to facilitate the electrical connection.

Such a fission chamber may, for example, have an external diameter of the order of 4 mm.

Whatever the embodiment of the plutonium Pu242 fission chamber, a fine layer of fissile material containing plutonium Pu242 is deposited on one of the electrodes, or on both electrodes. The enclosure is transparent to the transmission of the neutrons, in other terms it allows the neutrons to pass through its walls. In other words, the material constituting the wall of the enclosure has a small effective neutron capture section. The electrodes are either made completely of electrically conducting material, or are covered with a layer of electrically conducting material.

The layer of plutonium Pu242 may be made by electroplating, for example using a device such as the one represented in FIG. 2.

The plutonium Pu242 to be deposited can take the form of a liquid solution 100, placed in a beaker 102, in an electrolysis solution comprising a blend of nitric acid and ammonium oxalate.

The electrode or the support 120 on which the deposit is to be made is held in place by two ends 111, 113 made of Teflon, at the end of a rod 116, for example made of platinum covered with a Teflon film. The assembly is placed in the solution. The latter may be stirred to remain uniform, for example by placing a magnetised bar 104 at the bottom of the beaker 102, and by placing the latter on a magnetic agitator 106.

A wire 105, made of an electrically conducting material (for example made of platinum), is placed in the solution 102. A power source 107 enables an electric current to flow in this wire and in the solution. This current will cause the plutonium to be moved from the solution, and to attach itself to the electrode or the support 120.

It is possible, in some cases, to rotate the electrode or the support 120, using a motor 110, so as to obtain a uniform deposit over the entire surface in contact with the electrolysis solution. For example, the inner electrode may be rotated at 60 revolutions/min., as indicated by the arrow 108.

This method may apply both to the internal electrode and to the outer electrode. If it is desired that the plutonium should be deposited on the inner walls of the outer electrode (where the latter then has, for example, a cylindrical shape), the outer wall of the electrode is covered by a layer of protective material, for example a layer of Teflon.

In the cases presented above, by causing a current of approximately 350 mA to flow for two hours, it is possible to deposit 90 to 95% of the plutonium present in the electrolysis solution on the electrode or the support 120.

One problem of the Pu242 plutonium fission chamber is the presence of fissile impurities (Pu239 and Pu241) in the deposit, which gives the chamber a sensitivity to the thermal neutrons, which presence, although it is low, cannot be totally overlooked. In addition, the production of fissile isotopes by successive transmutations, although it is considerably lower than that observed in the case of uranium U238, increases this thermal sensitivity during the irradiation. The Pu242 plutonium fission chamber can therefore be used without a screen only in very particular circumstances, namely where the thermal flow is not too high, or with irradiations of short durations.

There is thus a genuine requirement to produce a measuring system enabling the contribution due to the fast neutrons (magnitude of interest) to be discriminated from that due to the thermal neutrons.

ACCOUNT OF THE INVENTION

To address the needs mentioned above, the invention proposes a device for online measurement of a flow of fast and epithermal neutrons $\phi_1(t_n)$ at instants $t_n$ over an energy interval $[E_{min}, E_{max}]$, characterised in that it includes:

a fast neutron detector (DNR) containing material suitable for detecting principally fast neutrons;

a thermal neutron detector (DNT) containing material suitable for detecting principally thermal neutrons;

a first electronic circuit which delivers, at instants $t_n$, a digital signal $VR(t_n)$ from a detection signal delivered by the fast neutron detector;

a second electronic circuit which delivers, at instants $t_n$, a second digital signal $VT(t_n)$ from a detection signal delivered by the thermal neutron detector;

means able to determine, at instants $t_n$, the isotopic composition of the fast neutron detecting material and the isotopic composition of the thermal neutron detecting material;

means able to determine, at instants $t_n$, from the said isotopic compositions, the progressive sensitivity to the fast neutrons $I_{11}(t_n)$ of the fast neutron detector, the progressive sensitivity to the thermal neutrons $I_{12}(t_n)$ of the fast neutron detector, the progressive sensitivity to the thermal neutrons $I_{21}(t_n)$ of the thermal neutron detector and the progressive sensitivity to the fast neutrons $I_{22}(t_n)$ of the thermal neutrons detector, means for computation, at instants $t_n$, of the flow of fast and epithermal neutrons $\phi 1(t_n)$ and of a flow of thermal neutrons $\phi 2(t_n)$, from the following system of equations:

$$VR(t_n)=KR \times I_{11}(t_n) \times \phi 1(t_n)+KR \times I_{12}(t_n) \times \phi 2(t_n), \text{ and}$$

$$VT(t_n)=KT \times I_{21}(t_n) \times \phi 1(t_n)+KT \times I_{22}(t_n) \times \phi 2(t_n)$$

where KR and KT are, respectively, a coefficient for calibration of the fast neutron detector and a coefficient for calibration of the thermal neutron detector.

According to an additional characteristic of the invention, the measuring device also includes means for computing a complete neutron flow $\phi(t_n, E)$ using the following equation:

$$\phi(t_n,E)=\phi_1(t_n) \cdot f_1(E)+\phi_2(t_n) \cdot f_2(E,\theta), \text{ where}$$

$$f_1(E)=f_{fiss}(E)+\alpha f_{epi}(E), \text{ and}$$

$$f_2(E,\theta)=f_{mxw}(E,\theta),$$

where $f_{fiss}(E)$ is a fission component of the flow of neutrons, where $f_{epi}(E)$ is an epithermal component of the flow of neutrons, where $f_{mxw}(E, \theta)$ is a Maxwellian component of the flow of neutrons, and where $\alpha$ is a coefficient of proportionality between the epithermal component of the flow of neutrons and the fission component of the flow of neutrons.

According to another additional characteristic of the invention, the measuring device also includes means for computing, over the interval $[E_{min}, E_{max}]$, $N_r$ integrated results at instants $t_n$, where $N_r$ is an integer greater than or equal to 1, where an integrated result of order k (k=1, 2, ..., $N_r$) is given by the following equation:

$$R_k(t_n) = m_{k1} \cdot \phi_1(t_n) + m_{k2}(\theta) \cdot \phi_2(t_n)$$

with $$m_{k1} = \int_{E_{min}}^{E_{max}} f_1(E) \cdot Y_k(E) dE, \text{ and}$$

$$m_{k2} = \int_{E_{min}}^{E_{max}} f_2(E, \theta_0) \cdot Y_k(E) dE, \text{ where}$$

$$f_1(E) = f_{fiss}(E) + \alpha f_{epi}(E), \text{ and}$$

$$f_2(E, \theta) = f_{mxw}(E, \theta),$$

where $f_{fiss}(E)$ is a fission component of the flow of neutrons, where $f_{epi}(E)$ is an epithermal component of the flow of neutrons, where $f_{mxw}(E, \theta)$ is a Maxwellian component of the flow of neutrons, and where α is a coefficient of proportionality between the epithermal component of the flow of neutrons and the fission component of the flow of neutrons, and where $Y_k(E)$ is a response function which characterises the integrated result of order k.

According to a particular characteristic of the invention, the response function $Y_k(E)$ is an identification function of an energy band of interest $[E_a, E_b]$ which coincides with the interval $[E_{min}, E_{max}]$ or which is included in the interval $[E_{min}, E_{max}]$ such that:

$$Y_k(E) = 1 \text{ if } E_a < E < E_b \text{ and}$$

$$Y_k(E) = 0 \text{ otherwise}$$

such that $R_k(t_n)$ is the flow of neutrons the energy of which is between $E_a$ and $E_b$, namely:

$$R_k(t_n) = \int_{E_a}^{E_b} \varphi(t_n, E) dE.$$

According to another particular characteristic of the invention, the response function $Y_k(E)$ is an effective macroscopic section of reaction $\Sigma_r(E)$ such that:

$$\Sigma_r(E) = \sum_i N_i' \cdot \sigma_i^r(E),$$

where $N_i'$ is a number of atoms of an isotope i present in a medium and $\sigma_i^r(E)$ is an effective microscopic section of isotope i with regards to a reaction r in the medium, such that $R_k(t_n)$ is a rate of reaction r in the medium, namely:

$$R_k(t_n) = \int_{E_{min}}^{E_{max}} \varphi(t_n, E) \sum_r (E) dE$$

where reaction r is, for example, a fission or capture or diffusion or damage reaction.

According to an additional characteristic of the measuring device of the invention, since the fast neutron detector and the thermal neutron detector are fission chambers, the progressive sensitivities $I_{11}(t_n)$, $I_{12}(t_n)$, $I_{21}(t_n)$ and $I_{22}(t_n)$ are written respectively:

$$I_{11}(t_n) = \sum_i N_i(t_n) \int_{E_{min}}^{E_{max}} f_1(E) \sigma_i^f(E) dE$$

$$I_{12}(t_n) = \sum_i N_i(t_n) \int_{E_{min}}^{E_{max}} f_2(E, \theta) \sigma_i^f(E) dE$$

where $N_i(t_n)$ is the isotopic composition at instant $t_n$ of an isotope i of the material suitable for detecting principally fast neutrons, and $\sigma_i^f(E)$ is the effective section of isotope i; and $$I_{21}(t_n) = \sum_j N_j(t_n) \int_{E_{min}}^{E_{max}} f_1(E) \sigma_j^f(E) dE$$

$$I_{22}(t_n) = \sum_j N_j(t_n) \int_{E_{min}}^{E_{max}} f_2(E, \theta) \sigma_j^f(E) dE$$

where $N_j(t_n)$ is the isotopic composition at instant $t_n$ of an isotope j of the material suitable for detecting principally thermal neutrons, and $\sigma_j^f(E)$ is the effective section of isotope j.

According to an additional characteristic of the invention the thermal neutron detector is a fission chamber containing Uranium U235.

According to another additional characteristic of the invention, since the fast neutron detector is a fission chamber and the thermal neutron detector is a collectron, the progressive sensitivities $I_{11}(t_n)$, $I_{12}(t_n)$, $I_{21}(t_n)$ and $I_{22}(t_n)$ are written respectively:

$$I_{11}(t_n) = \sum_i N_i(t_n) \int_{E_{min}}^{E_{max}} f_1(E) \sigma_i^f(E) dE, \text{ and}$$

$$I_{12}(t_n) = \sum_i N_i(t_n) \int_{E_{min}}^{E_{max}} f_2(E, \theta) \sigma_i^f(E) dE$$

where $N_i(t_n)$ is the isotopic composition at instant $t_n$ of an isotope i of the material suitable for detecting principally fast neutrons, and $\sigma_i^f(E)$ is the effective section of isotope i; and $$I_{21}(t_n) = \bigcup [\Psi(t_n)] \int_{E_{min}}^{E_{max}} f_1(E) S_{Rh}(E) dE$$

$$I_{22}(t_n) = \bigcup [\Psi(t_n)] \int_{E_{min}}^{E_{max}} f_2(E, \theta) S_{Rh}(E) dE$$

where $\cup[\Psi(t_n)]$ is a wear and tear function of the collectron tabulated as a function of the thermal fluence at instant $t_n$, $\Psi(t_n)$ of the material suitable for detecting principally thermal neutrons, and $S_{Rh}(E)$ is the sensitivity of the collectron.

According to an additional characteristic of the invention the thermal neutron detector is a collectron made of Rhodium or Vanadium or Silver.

According to another additional characteristic of the invention the fast neutron detector is a fission chamber with a threshold fissile deposit, for example a fission chamber containing plutonium Pu242 pure to at least 99.5%.

According to another additional characteristic of the invention the fission chamber containing plutonium Pu242 pure to at least 99.5% includes:

an enclosure able to contain a pressurised detection gas, and the walls of which allow the neutrons to traverse them, a first and a second electrode, electrically insulated from one another, between which a voltage may be applied, a fissile material, including plutonium 242 pure to at least 99.5% atomic, deposited on at least one of the two electrodes, and a detection gas, included in the pressurised enclosure, ionisable by fission products.

According to an additional characteristic of the invention the first electronic circuit includes a digital variance computation processor which delivers the digital signal $VR(t_n)$ in the form of a digital variance of the signal delivered by the fast neutron detector.

According to another additional characteristic of the invention, the second electronic circuit includes a digital variance computation processor which delivers the digital signal $VR(t_n)$ in the form of a digital variance of the signal delivered by the thermal neutron detector.

According to another additional characteristic of the invention the second electronic circuit is a digital current-voltage conversion circuit.

The measuring device of the invention preferentially discards the component of the signal due to the gamma radiation. Tests undertaken in an irradiation reactor indeed show that the gamma radiation can be responsible for more than half the average current produced by a threshold fission chamber. In this case, it is recommended that the fission chamber be operated in a mode known as "fluctuation", or "Campbell". This consists in being concerned with the variance of the current produced by the fission chamber, rather than its average. The contribution of the gamma radiation may then be overlooked, since this contribution represents only a view percentage points, at most, of the variance.

In the context of the preferential embodiment of the invention according to which the contribution of the gamma radiation is made negligible, a particularly advantageous measuring device of the invention includes, for example, the following essential elements:

A neutron detector which is sensitive principally to fast neutrons such as, for example, a Pu242 plutonium fission chamber containing argon to which 4% nitrogen has been added;

an electronic processor enabling the signal delivered by the Pu242 plutonium fission chamber to be operated in fluctuation mode;

a connection by cable compatible with a use in fluctuation mode, and which connects the Pu242 plutonium fission chamber to the processing electronics which uses the signal delivered by the fission chamber (the characteristic impedance of the cable is then modified to suit the input impedance of the electronic processor);

a neutron detector sensitive principally to thermal neutrons such as, for example, a collectron (SPND for "Self Powered Neutron Detector") or a uranium U235 fission chamber;

PMM computation codes (PMM for "Process of Modelling of Measurement"); and a computer.

BRIEF DESCRIPTION OF THE FIGURES

Other characteristics and advantages of the invention will appear on reading the preferential embodiment made in reference to the attached figures, among which:

FIG. 2 represents a device suitable for deposing fissile material in the fission chambers represented in FIGS. 1A and 1B;

In all the figures the same references designate the same elements.

DETAILED ACCOUNT OF PARTICULAR EMBODIMENTS OF THE INVENTION

Figure 1A:
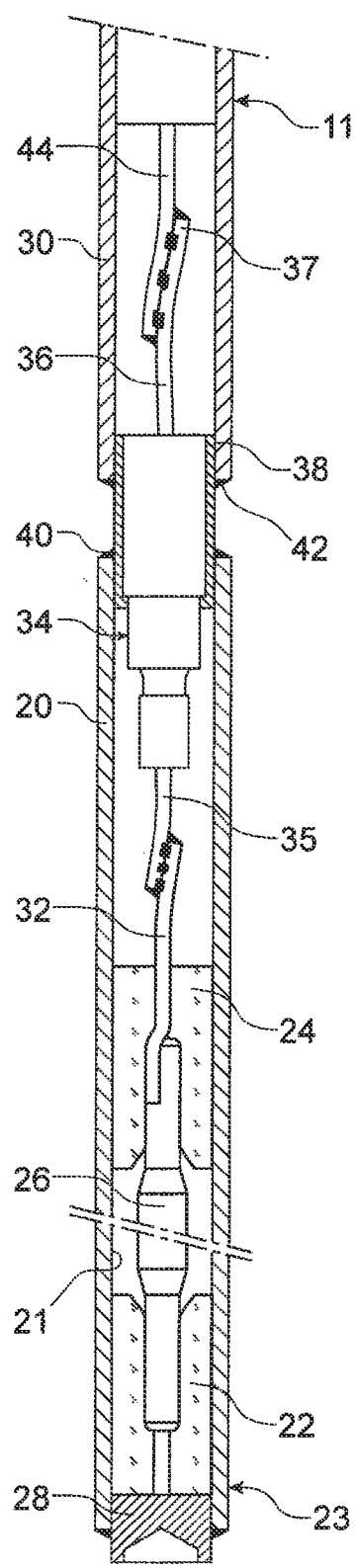
FIGS. 1A-1B represent two examples of a fission chamber able to be used to produce a measuring device in accordance with the invention.
Figure 1B:
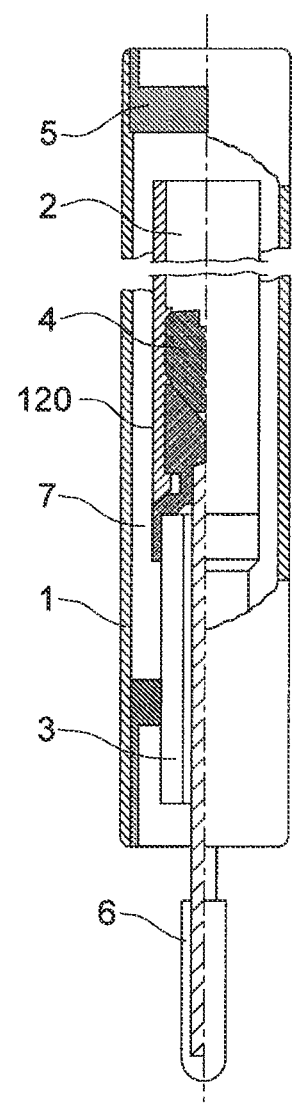

FIGS. 1A, 1B and 2 have previously been described. It is therefore of no interest to return to them.

Figure 3:
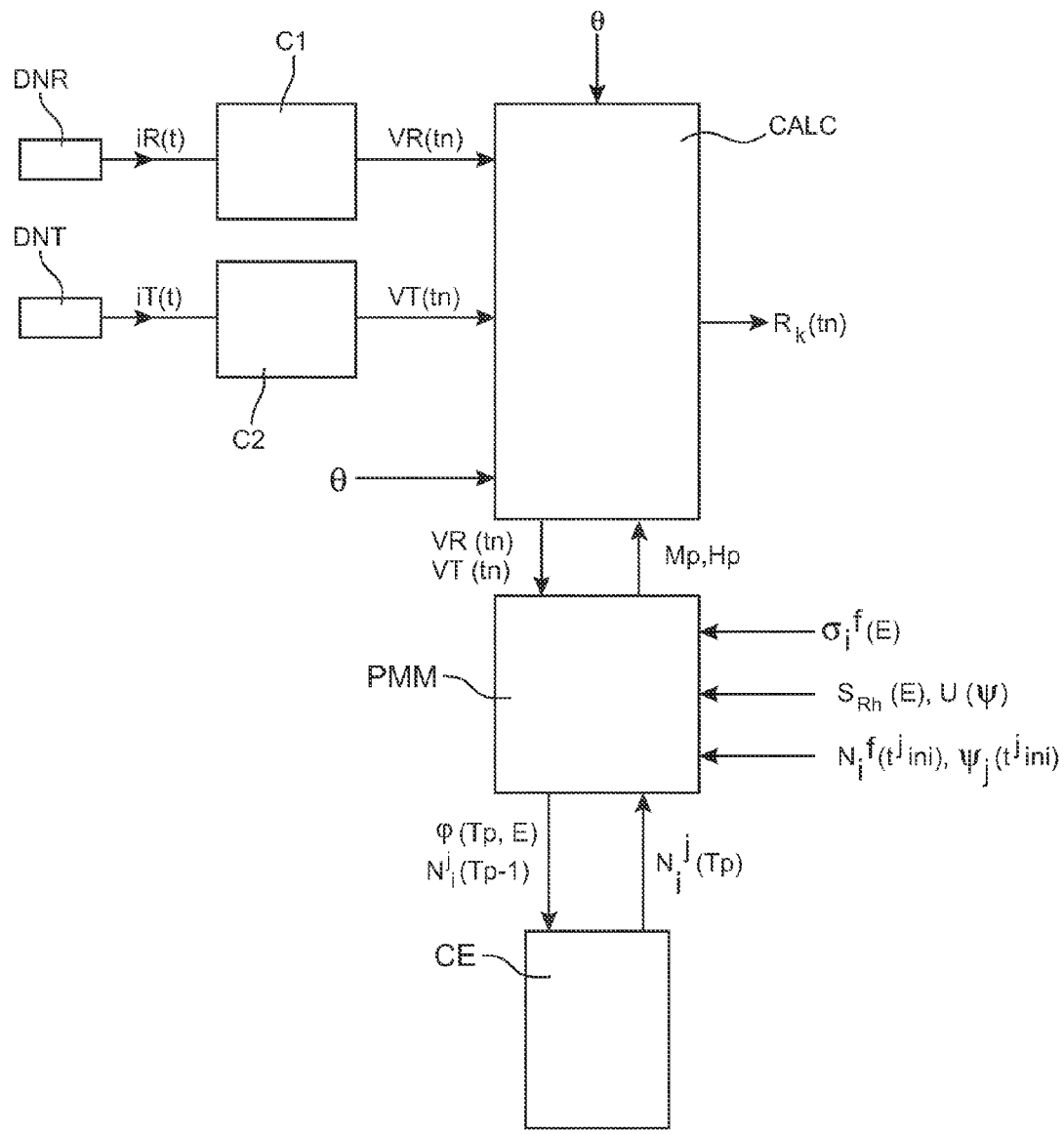
FIG. 3 represents an outline diagram of a measuring device in accordance with the invention.
Figure 4:
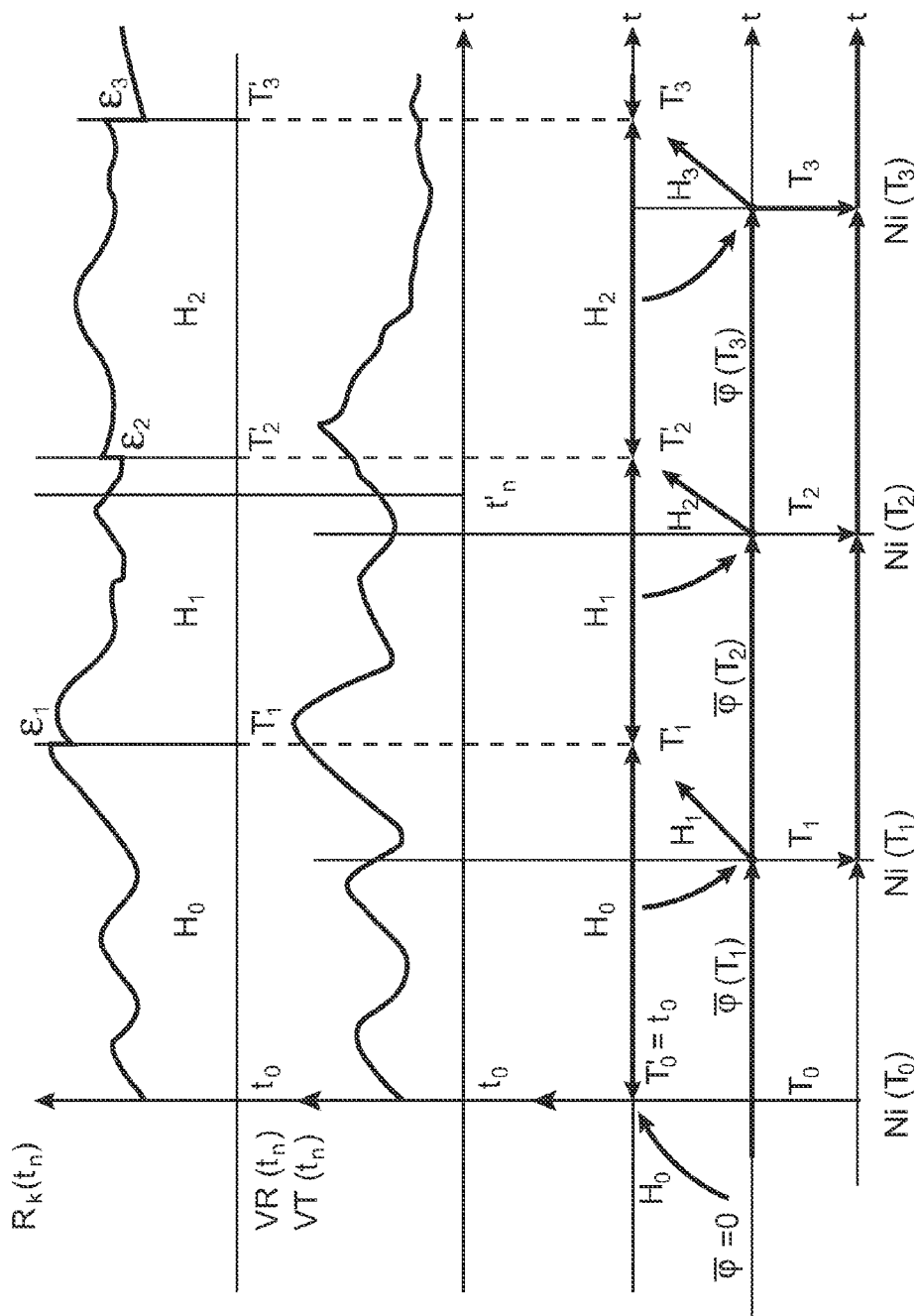
FIG. 4 represents a timing diagram which illustrates the operation of the measuring device of the invention of FIG. 3.

FIG. 3 represents an outline diagram of a fast and epithermal neutron flow online measuring device in accordance with the invention, and FIG. 4 shows timing diagrams of use in understanding the operation of the measuring device of the invention represented in FIG. 3.

The device includes a DNR detector for measurement of fast neutrons, a first electronic circuit C1 for conditioning and processing of the signal originating from the DNR detector, a DNT detector for thermal neutron measurement, a second electronic circuit C2 for conditioning and processing of the signal originating from the DNT detector, an evolution code CE, a computation code PMM and a computer CALC.

The DNR detector delivers a current iR(t) and the DNT detector delivers a current iT(t). Currents iR(t) and iT(t) are transmitted, respectively, to the conditioning and processing circuit C1 and to the second conditioning and processing circuit C2 which deliver, respectively, a digital signal $VR(t_n)$ and a digital signal $VT(t_n)$ at discrete instants $t_n$. As will be made clear below, the digital signal $VR(t_n)$ is preferentially the digital variance of the current iR(t). However, the invention concerns digital signals other than variance of the current such as, for example, the average value of the current. The digital signals $VR(t_n)$ and $VT(t_n)$ are transmitted to the computer CALC.

The computer CALC computes, at each instant $t_n$, at least one integrated result $R_k(t_n)$ (k=1, 2, ..., $N_R$) over a chosen energy interval [$E_{min}$, $E_{max}$] from the digital signals $VR(t_n)$ and $VT(t_n)$ and from data delivered by the evolution code CE and the computation code PMM. Index k is a current index varying from 1 to $N_R$, where $N_R$ represents a maximum number of complete results computed at the same instant $t_n$.

The computation of the results $R_k(t_n)$ will now be described.

At each instant $t_n$, the computer CALC receives the measurement signals $VR(t_n)$ and $VT(t_n)$ and performs the following computations:

1) Computation of a fast and epithermal neutron flow component $\phi_1(t_n)$ and of a thermal neutron flow component $\phi_2(t_n)$ such that:

$$\phi_1(t_n) = h_{11} \cdot VR(t_n) + h_{12} \cdot VT(t_n)$$

$$\phi_2(t_n) = h_{21} \cdot VR(t_n) + h_{22} \cdot VT(t_n)$$

2) Computation of at least one result $R_k(t_n) = \int_{E_{min}}^{E_{max}} \phi(t_n, E) \cdot Y_k(E) dE$ using the following equation:

$$R_k(t_n) = m_{k1} \cdot \phi_1(t_n) + m_{k2}(\theta) \cdot \phi_2(t_n)$$

Where the magnitudes $m_{k1}$ and $m_{k2}$ are given by the following respective equations:

$$m_{k1} = \int_{E_{min}}^{E_{max}} f_1(E) \cdot Y_k(E) dE,$$

$$m_{k2} = \int_{E_{min}}^{E_{max}} f_2(E, \theta_0) \cdot Y_k(E) dE$$

where $Y_k(E)$ is a response function defined in relation to the energy support $[E_{min}, E_{max}]$ and which characterises the complete result $R_k(t_n)$.

As a non-restrictive example, for the computation of a fast neutron flow, the response function $Y_k(E)$ corresponds to an energy support $[E_S, E_{max}]$, where energy $E_S$ is a threshold value above which the neutrons are considered to be fast neutrons. The threshold value $E_S$ may be equal, for example, to 100 keV or 1 Mev. This gives the following:

$$Y_k(E) = 1 \text{ for } E > E_S, \text{ and}$$

$$Y_k(E) = 0 \text{ for } E \leq E_S$$

The two functions $f_1(E)$ and $f_2(E, \theta)$ are given by the following respective equations:

$$f_1(E) = f_{fiss}(E) + \alpha f_{epi}(E)$$

$$f_2(E, \theta) = f_{mxw}(E, \theta)$$

where $f_{fiss}(E)$, $f_{epi}(E)$ and $f_{mxw}(E, \theta)$ are, respectively, the fission component of the neutron flow, the epithermal component of the neutron flow and the Maxwellian component of the neutron flow. Components $f_{fiss}(E)$, $f_{epi}(E)$ and $f_{mxw}(E, \theta)$ are magnitudes which are known in the art. Coefficient $\alpha$ is a known coefficient of proportionality between the epithermal component and the fission component.

As has been previously mentioned, the invention concerns response functions $Y_k(E)$ other than the response function defined above. The response function $Y_k(E)$ may thus be an identification function of an energy band of interest $[E_a, E_b]$ in the interval $[E_{min}, E_{max}]$ or identical to the interval $[E_{min}, E_{max}]$. This then gives the following:

$$Y_k(E) = 1 \text{ if } E_a < E < E_b \text{ and}$$

$$Y_k(E) = 0 \text{ otherwise.}$$

The response function can also be an effective macroscopic section of reaction $\Sigma_r(E)$ such as:

$$\Sigma_r(E) = \sum_i N_i' \cdot \sigma_i^r(E),$$

where $N_i'$ is a number of atoms of an isotope i present in a medium and $\sigma_i^r(E)$ is an effective microscopic section of isotope i with regards to a reaction r in the medium, such that $R_k(t_n)$ is a rate of reaction r in the medium.

Advantageously, the evolution during flow of the magnitude $N_i'$ may be computed using an evolution code, for example the evolution code CE used for the computation of the isotopic compositions of the detecting materials of the fission chambers, using the flow $\phi(t_n, E)$ determined by the measuring system.

In the general case in which a number $N_R$ of flow computations are made simultaneously at the same instant $t_n$, the previous computations are written in the form of a matrix. Omitting the time variable this then gives:

$$\begin{pmatrix} R_1 \\ \dots \\ R_{N_R} \end{pmatrix} = M \cdot H \cdot \begin{pmatrix} VR \\ VT \end{pmatrix}$$

$$M = \begin{pmatrix} m_{11} & m_{12} \\ \dots & \dots \\ m_{N_R 1} & m_{N_R 2} \end{pmatrix} \text{ and } H = \begin{pmatrix} h_{11} & h_{12} \\ h_{21} & h_{22} \end{pmatrix}$$

The M and H matrices are firstly computed by the PMM in an initialisation phase, and are then periodically updated by the PMM, at discrete instants $T_p'$, as stipulated below.

The initial matrices M and H are noted $M_0$ and $H_0$. The matrices M and H between the update instants $T_p'$ and $T_{p+1}'$ are noted $M_p$ and $H_p$.

The function of the PMM is to compute the matrices for interpreting the M and H measurements on the basis of physical models of the neutron flow and of the detectors.

1) Initialisation Phase

Before instant $t_0$ of the first measurement, the PMM performs the following operations:

1.1) Computation of the Matrix M $m_{k1}$ and $m_{k2}$ are computed using a digital integration algorithm. This gives the following:

$$m_{k1} = \int_{E_{min}}^{E_{max}} f_1(E) \cdot Y_k(E) dE, k = 1, \dots, N_R$$

$$m_{k2} = \int_{E_{min}}^{E_{max}} f_2(E, \theta_0) \cdot Y_k(E) dE, k = 1, \dots, N_R$$

The temperature of the moderator $\theta_0$ is either entered by the user (it is then presumed to be constant throughout the experiment), or measured when the system starts.

As has been previously stipulated, the $Y_k(E)$s are response functions which define the chosen integrated result. It is recalled that:

$$R_k(t_n) = \int \phi(t_n, E) \cdot Y_k(E) dE$$

As has been previously mentioned, the two functions $f_1(E)$ and $f_2(E, \theta)$ are given by:

$$f_1(E) = f_{fiss}(E) + \alpha \cdot f_{epi}(E)$$

$$f_2(E, \theta) = f_{mxw}(E, \theta),$$

where the fission component $f_{fiss}$, epithermal component $f_{epi}$ and Maxwellian component $f_{mxw}$ are magnitudes which are known in the art.

As a non-restrictive example, the fission component depends on the energy with the function of the following form:

$$f_{fiss}(E) = \kappa_{fiss} \cdot \exp\left(-\frac{E}{a}\right) \cdot \sinh\left(\sqrt{bE}\right),$$

where parameters a and b depend on the type of fuel used in the reactor.

For the epithermal component this gives, for example:

$$f_{epi}(E) = \begin{cases} \kappa_{epi} \cdot \dfrac{E^2 - E_0^2}{E \cdot (E_1^2 - E_0^2)} & si \quad E_0 \le E \le E_1 \\ \kappa_{epi} \cdot \dfrac{1}{E} & si \quad E_1 \le E \le E_2 \\ \kappa_{epi} \cdot \dfrac{E^2 - E_3^2}{E \cdot (E_2^2 - E_3^2)} & si \quad E_2 \le E \le E_3 \\ 0 & sinon \end{cases}$$

where, as a non-restrictive example:

$E_0=0$ eV; $E_1=0.2$ eV; $E_2=0.25$ MeV; $E_3=1$ MeV

Lastly, the Maxwellian component is written, for example:

$$f_{mxw}(E, \theta) = \left(\frac{1}{K\theta}\right)^2 \cdot E \cdot \exp\left(-\frac{E}{K\theta}\right),$$

where $K=8.617343 \times 10^{-5}$ eV/K (K is the Boltzmann constant divided by the charge of the electron).

The normalisation coefficients $\kappa_{fiss}$ and $\kappa_{epi}$ are such that:

$$\int_0^\infty f_{fiss}(E)dE = \int_0^\infty f_{epi}(E)dE = 1.$$

1.2) Computation of $H_0$ 1.2.1 Case in which the DNR and DNT Detectors are Fission Chambers:

That is, a fission chamber identified by the index j:

j=1 is the fission chamber for the detection of the fast neutrons (for example, a Pu242 chamber), and j=2 is the fission chamber for the detection of the thermal neutrons (for example, a U235 chamber).

Step 1: Computation of the Isotopic Composition

The input data consists of the initial isotopic composition $N_i^j(t_{ini}^j)$ of the deposit of the fission chamber (number of atoms of each isotope i). This isotopic composition given at instant $t_{ini}^j < t_0$ results from chemical analyses made by the manufacturer of the fission chamber or, advantageously, results from computations made by the PMM in a previous irradiation of the fission chamber.

With this input data, the PMM commences an evolution computation with a zero neutron flow, using the evolution code CE which relies, moreover, on nuclear data (effective sections, radioactive decay constants, etc.) taken from standard libraries (of the JEF, ENDF, etc. type).

The result of this evolution computation which consists merely of a decay computation (zero flow) is the isotopic composition of the deposit at $t_0$: $N_i^j(t_0)$.

Step 2: Computation of the Fast and Thermal Sensitivities of the Fission Chamber It is recalled that the sensitivities $I_{ji}$ of a fission chamber are defined as the ratio between the fission rate $RD_j$ and the flow component in question, namely:

$$RD_j = I_{j1} \cdot \phi_1 + I_{j2} \cdot \phi_2$$

The PMM then computes the fast and thermal sensitivity coefficients of the fission chamber:

$$I_{j1} = \sum_i N_i^j(t_0) \cdot \int_{E_{min}}^{E_{max}} f_1(E) \cdot \sigma_i^f dE$$

$$I_{j2} = \sum_i N_i^j(t_0) \cdot \int_{E_{min}}^{E_{max}} f_2(E, \theta_0) \cdot \sigma_i^f(E) dE$$

The temperature of the moderator $\theta_0$ is either entered by the user (it is then presumed to be constant throughout the experiment), or measured when the system starts.

The input data $\sigma_i^f(E)$ defined in relation to the energy support $[E_{min}, E_{max}]$ designates the effective fission sections of the isotopes i. It is generally taken from standardised nuclear data libraries (of the JEF, ENDF, etc. type).

1.2.2 Case in which the DNR Detector is a Fission Chamber and in which the DNT Detector is a Collectron (SPND)

The difference between a collectron and a fission chamber relates to the fact that the self-protection and self-absorption phenomena in the solid detecting material of a collectron cannot be overlooked as is done in the case of a fission chamber, the deposit of which is extremely fine (mass per unit area less than 1 mg/cm$^2$). It follows that the computations of evolution during flow are more complex and cannot be performed online. They are therefore performed in advance, and the results are tabulated in the form of a wear and tear function dependent on the thermal fluence integrated by the collectron, as will be explained below.

That is, a collectron, for example a rhodium (Rh) collectron, identified by index j. It is recalled that the sensitivities of a collectron are defined as the ratio between the capture rate $RD_j$ and the flow component in question, namely:

$$RD_j = I_{j1} \cdot \phi_1 + I_{j2} \cdot \phi_2$$

In this case the input data is:

$\psi_j(t_{ini}^j)$: Initial thermal fluence integrated by the collectron (time integral of the thermal flow). This fluence given at instant $t_{ini}^j < t_0$ is zero in the case of a new collectron. In other cases it results from the computations made by the PMM during a previous use of the collectron (irradiation);

$S_{Rh}(E)$: sensitivity of the SPND, for example a rhodium Rh SPND, taking account of the effective capture section, of the self-protection of the emitter and of the self-absorption of the emitted electrons (computation made by an expert);

$U(\psi)$: wear and tear function, tabulated as a function of the thermal fluence $\psi$ (computation made by an expert, or feedback from experimental experience).

The computations of $S_{Rh}$, and U are described, for example, in the publication mentioned in bibliographical reference [6].

The PMM directly computes the fast and thermal sensitivities of the collectron using the following equations:

$$I_{j1} = U(\Psi_j(t_{ini}^j)) \cdot \int_{E_{min}}^{E_{max}} f_1(E) \cdot S_{Rh}(E) dE$$

$$I_{j2} = U(\Psi_j(t_{ini}^j)) \cdot \int_{E_{min}}^{E_{max}} f_2(E, \theta) \cdot S_{Rh}(E) dE$$

The temperature of the moderator $\theta$ is either entered by the user (and presumed to be constant throughout the experiment), or measured when the system starts.

1.2.3) Computation of $H_0$

The PMM inverts a 2×2 matrix:

$$H_0 = \begin{pmatrix} K_1 \cdot I_{11} & K_1 \cdot I_{12} \\ K_2 \cdot I_{21} & K_1 \cdot I_{22} \end{pmatrix}^{-1}$$

The calibration coefficient $K_j$ is the ratio between the magnitude $V_j$ sent to the computer and the rate of interaction (fission or capture) $RD_j$ in the detector $j$ ($V_j = K_j \cdot RD_j$).

2) Updating of the M and H Matrices 2.1) Time Synchronisation of the Computer CALC and of the PMM Time synchronisation of the computer CALC and of the PMM is illustrated in FIG. 4.

The PMM initiates a computation to update M and H at instants noted $T_p$ (cf. $T_0, T_1, T_2, T_3, \ldots$ in FIG. 4).

When the computation has terminated, the PMM sends the new matrices noted $M_p$ and $H_p$ to the computer in order for it to use them in place of the previous matrices noted $M_{p-1}$ and $H_{p-1}$.

The computer takes $M_p$ and $H_p$ into account at instant $T_p' > T_p$. The duration $(T_p' - T_p)$ can vary: it is simply necessary that the instants $T_p$ are chosen such that $T_p' < T_{p+1}$.

In practice, as low as possible a constant value $\Delta T_p = T_p - T_{p-1} = Q \cdot dt$ is chosen, as a function of the computation performances permitted by the processor responsible for the PMM. Other sequencing criteria of the PMM are conceivable, but they are of no particular interest compared to the one we have chosen.

Observation: although the measurements are constant in proximity to instant $T_p'$, the change of interpretation matrices does however introduce a minor jump $\epsilon_p$ (cf. $\epsilon_1, \epsilon_2, \epsilon_3$ in FIG. 4) in the results:

$$\begin{pmatrix} R_1 \\ \ldots \\ R_{N_R} \end{pmatrix} = M \cdot H \cdot \begin{pmatrix} VR \\ VT \end{pmatrix}$$

The jump $\epsilon_p$ is in fact the compensation for the sensitivity error which has accumulated (slowly) since the last PMM computation at $T_{p-1}$. This error will remain negligible if $(T_p - T_{p-1})$ is sufficiently short (in fact, provided the fluence integrated by the detectors in this time interval is sufficiently low).

2.2) Computation of the Average Measurements

The PMM uses the measurements VR and VT to update the interpretation matrices M and H used by the computer. If the temperature of the moderator $\theta$ is measured, it is also used in this process; otherwise, the PMM uses the temperature entered by the user, which is assumed to be constant throughout the irradiation of the detectors.

Between instants $T_{p-1}$ and $T_p$, the PMM accumulates the measurements VR, VT and possibly $\theta$ which are sent to it by the computer at each instant $t_n$, with the aim of computing the following average values from them:

$$\overline{VR}(T_p) = \frac{1}{N_p} \sum_{t_n = T_{p-1}}^{T_p} VR(t_n)$$

$$\overline{VT}(T_p) = \frac{1}{N_p} \sum_{t_n = T_{p-1}}^{T_p} VT(t_n)$$

$$\overline{\theta}(T_p) = \frac{1}{N_p} \sum_{t_n = T_{p-1}}^{T_p} \theta(t_n)$$

if $\theta$ is measured, $\overline{\theta}(T_p) = \theta$ if $\theta$ is entered.

$N_p$ is the number of measurements sent to the PMM between instants $T_{p-1}$ and $T_p$:

$$N_p \approx (T_p - T_{p-1})/dt$$

2.3) Computation of the Average Neutron Flow at Instant $T_p$

The average measurements are interpreted by the PMM as the computer does using the matrix H. The following is computed firstly:

$$\begin{pmatrix} \overline{\varphi}_1(T_p) \\ \overline{\varphi}_1(T_p) \end{pmatrix} = H_{p-1} \cdot \begin{pmatrix} \overline{VR}(T_p) \\ \overline{VT}(T_p) \end{pmatrix}$$

subsequently
the average neutron flow by:

$$\overline{\phi}(T_p, E) = \overline{\varphi}_1(T_p) \cdot f_1(E) + \overline{\varphi}_2(T_p) \cdot f_2(E, \overline{\theta}(T_p))$$

Observation 1: the average flow is used to compute $H_p$. The PMM therefore uses $H_{p-1}$ to compute $H_p$; this is an iterative algorithm.

Observation 2: it is acceptable to use the average flow in the following steps, since it is supposed that the time interval between two PMM computations is as short as possible.

2.4) Updating of Matrix M

Nothing needs to be done if the temperature $\theta$ is entered by the user and presumed constant: $M_p = M_0$.

If the temperature $\theta$ is measured, only the second column of M must be updated. We proceed as with $M_0$, replacing $\theta_0$ by $\overline{\theta}(T_p)$:

$$m_{k2} = \int_{E_{min}}^{E_{max}} f_2(E, \overline{\theta}(T_p)) \cdot Y_k(E) dE, k = 1, \ldots, N_R$$

2.5) Updating of Matrix H

The computation of $H_p$ differs from that of $H_0$ by the fact that the neutron flow is no longer zero, and that the evolution computations must take account of the interaction of the neutrons with the detecting materials.

2.5.1 Computation of the Sensitivity of the Fission Chambers

That is, a fission chamber identified by index $j$ ($j=1$ for the DNR fission chamber and $j=2$ for the DNT fission chamber).

Step 1: Computation of the Isotopic Composition

The input data is:

The isotopic composition $N_i^j(T_{p-1})$ of the deposit of the fission chamber (number of atoms of each isotope i) at instant $T_{p-1}$, $N_i^j(T_0)=N_i^j(t_0)$ being computed by the PMM in the initialisation phase, and The average neutron flow $\bar{\phi}(E, T_p)$.

With this input data the PMM commences an evolution computation during neutron flow using the evolution code CE which relies, moreover, on DN nuclear data (effective sections, radioactive decay constants, etc.) taken from standard libraries (of the JEF, ENDF, etc. type).

The result of this evolution computation the isotopic composition of the deposit at instant $T_p$: $N_i^j(T_p)$.

Step 2: Computation of the Fast and Thermal Sensitivities of the Fission Chamber It is recalled that the sensitivities $I_{ji}$ of a fission chamber are defined as the ratio between the fission rate and the flow component in question, namely:

$$RD_j = I_{j1} \cdot \phi_1 + I_{j2} \cdot \phi_2$$

The PMM can then compute the fast and thermal sensitivity coefficients of the fission chamber at instant $T_p$:

$$I_{j1}(T_p) = \sum_i N_i^j(T_p) \cdot \int_{E_{min}}^{E_{max}} f_1(E) \cdot \sigma_i^f(E) dE$$

$$I_{j2}(T_p) = \sum_i N_i^j(T_p) \cdot \int_{E_{min}}^{E_{max}} f_2(E, \bar{\theta}(T_p)) \cdot \sigma_i^f(E) dE$$

The input data $\sigma_i^f(E)$ defined in relation to the energy support $\sigma_i^f(E)$ designates the effective fission sections of the isotopes i. It is taken from standardised nuclear data libraries (of the JEF, ENDF, etc. type).

2.5.2 Computation of the Sensitivity of the Collectron (in the Case where the DNT Detector is a Collectron)

That is, a collectron, for example a rhodium (Rh) collectron, identified by index j.

Two steps are involved.

Step 1: Computation of the Thermal Fluence Integrated by the Collectron

We proceed in an iterative manner:

$$\psi_j(T_p) = \psi_j(T_{p-1}) + \bar{\phi}_{SPND}(T_p) \cdot (T_p - T_{p-1}), \text{ and}$$

$$\psi_j(T_0) = \psi_j(t_0)$$

where $\bar{\phi}_{SPND}(T_p)$ is the thermal flow deduced from $\bar{\phi}(E, T_p)$, using the same convention as the one used in the computations of the functions $S_{Rh}(E)$ and $U(\psi)$.

In practice, an expert who has made the computations of the functions $S_{Rh}(E)$ and $U(\psi)$ has defined two parameters $\alpha_1$ and $\alpha_2$ such that:

$$\bar{\phi}_{SPND}(T_p) = \alpha_1 \cdot \bar{\phi}_1(T_p) + \alpha_2 \cdot \bar{\phi}_2(T_p)$$

Step 2: Computation of the Fast and Thermal Sensitivities of the Collectron

The input data is:

- $\psi_j(T_p)$: the thermal fluence integrated by the collectron (time integral of the thermal flow);
- $S_{Rh}(E)$: the sensitivity of the collectron, for example a rhodium (Rh) collectron, taking account of the effective capture section, of the self-protection of the emitter and of the self-absorption of the emitted electrons (computation made by an expert).
- $U(\psi)$: the wear and tear function, tabulated as a function of the thermal fluence $\psi$ (computation made by an expert, or feedback from experimental experience).

The PMM directly computes the fast and thermal sensitivities of the collectron using the following equations:

$$I_{j1}(T_p) = U(\Psi_j(t_p)) \cdot \int_{E_{min}}^{E_{max}} f_1(E) \cdot S_{Rh}(E) dE$$

$$I_{j2}(T_p) = U(\Psi_j(t_p)) \cdot \int_{E_{min}}^{E_{max}} f_2(E, \bar{\theta}(T_p)) \cdot S_{Rh}(E) dE$$

2.5.3) Computation of $H_p$

The PMM inverts a 2×2 matrix:

$$H_p = \begin{pmatrix} K_1 \cdot I_{11}(T_p) & K_1 \cdot I_{12}(T_p) \\ K_2 \cdot I_{21}(T_p) & K_1 \cdot I_{22}(T_p) \end{pmatrix}^{-1}$$

The calibration coefficient $K_j$ is the ratio between the magnitude $V_j$ sent to the computer and the rate of interaction (fission or capture) $RD_j$ in the detector j ($V_j = K_j \cdot RD_j$).

2.6) Transmission of the Matrices M and H

The PMM sends the matrices $M_p$ and $H_p$ to the computer CALC which substitutes them into the interpretation matrices M and H at instant $T_p' > T_p$.

According to the preferential embodiment of the invention, the DNR detector is a fission chamber having a threshold fissile deposit. Such a fission chamber is represented, for example, in FIGS. 1A and 1B. The threshold fissile deposit may be a deposit of plutonium Pu242, as has been previously mentioned. The threshold fissile deposit may also be a deposit of uranium U238 or of neptunium Np237 or again of thorium Th232. In the context of the preferred embodiment of the invention, a connecting cable connects the DNR detector to the circuit C1. This connecting cable is used simultaneously for to polarise electrically the detector and to transmit the signal delivered by the fission chamber to the processing circuit C1. The part of the cable subject to the neutron flow must be made from a mineral insulator (alumina, silica, magnesium). The cable is preferentially integrated in the detector, and its outer diameter is less than that of the detector. This cable must also have electrical properties compatible with an operation of the fission chamber in fluctuation mode, namely: a low capacitance per unit length, a characteristic impedance close to the input impedance of the electronics (typically 50Ω) and a low transfer impedance to guarantee robust immunity to parasite signals. To this end, a copper conductor and copper screening are used, with a casing made from stainless steel or Inconel, to provide satisfactory mechanical properties in the reactor. The cable has, for example, a diameter of roughly between 2 mm and 2.2 mm for a fission chamber of 3 mm in diameter, and roughly equal to 1.3 mm for a fission chamber of 1.5 mm in diameter (optimisation of the transfer impedance).

Figure 5:
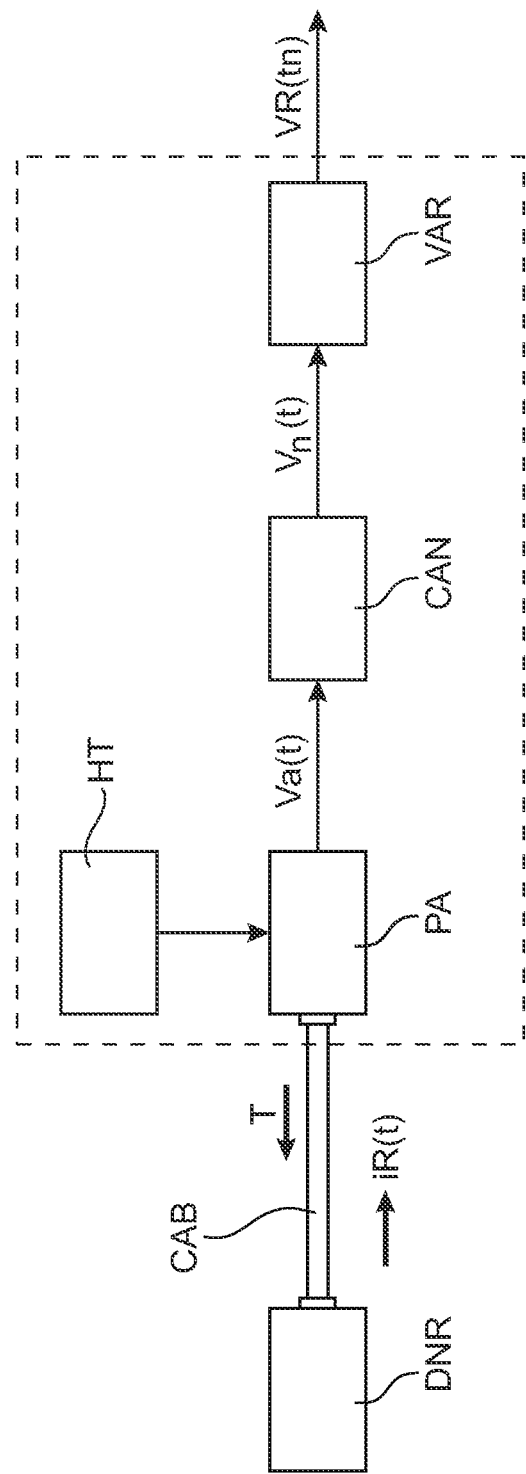
FIG. 5 represents an outline diagram of a particular circuit used in the measuring device of the invention.

FIG. 5 represents an outline diagram showing in detail the conditioning and processing circuit C1 according to the preferred embodiment of the invention. Circuit C1 includes a preamplifier PA, an analog/digital converter CAN, a digital variance computation processor VAR and a high-voltage generator HT. The DNR detector is connected to the circuit C1 by a cable CAB. The preamplifier PA converts the current iR(t) which it receives, over the cable CAB, into an analog voltage Va(t) which is transmitted to the analog/digital converter CAN. The high voltage T delivered by the high-voltage generator HT transits, via the preamplifier PA and the cable CAB, to the DNR detector. The analog/digital converter CAN converts the analog voltage Va(t) into a digital voltage $V_n(t_n)$, sampled at discrete intervals $t_n = n \cdot dt$ (dt is the sampling period, typically dt=1 μs, and n is an integer representing the time index of the sample), which is transmitted to the digital variance computation processor VAR, which delivers the digital variance VR($t_n$).

The signal processor preferentially uses the fluctuation mode based on Campbell's theorem (cf. reference [4]). This theorem demonstrates that the electrical signal produced by a pile-up of pulses in a fission chamber has interesting statistical properties. The average and the variance of this signal are, indeed, both proportional to the incident neutron flow, but whereas the average is also proportional to the average charge Q created in the gas for each detected neutron, the variance, for its part, is proportional to the square of this charge.

In a manner known in the art, it is said that a fission chamber is operated in "current mode" when it is the average of the current produced which is of interest. The sensitivity of a fission chamber in current mode is proportional to Q. Since the charge created by a neutron is generally 100 times higher than that produced by a gamma photon, the same will apply to the relative sensitivities, respectively, to the neutron and gamma flows. This property turns the fission chamber into a neutron detector which is generally well suited for measuring neutrons in the presence of intense gamma radiation (a typical situation of measurements in a reactor). Under certain circumstances the rejection of the gamma radiation in current mode may, however, be insufficient: either because the gamma radiation is very intense (notably in an irradiation reactor), or because the sensitivity to the neutrons is reduced (this is the case of Pu242 fission chambers, the sensitivity of which to fast neutrons is two orders of magnitude less than that of traditional U235 fission chambers with regard to the thermal neutrons). The "current mode" signal must then be corrected by subtracting from it the signal produced by a nearby fission chamber without fissile deposit (and which is therefore sensitive exclusively to the gamma radiations). Two detectors must then be used to access the neutron flow.

Operating the fission chamber in "fluctuation mode" is, in this case, an interesting alternative. Since the sensitivity depends on the quantity $Q^2$, the sensitivity to the gamma radiation will therefore be approximately 10,000 times less than that observed with regard to the neutrons. It is then possible to obtain, with a single fission chamber, a sufficiently effective rejection of the gamma rays, even under quite difficult circumstances. With plutonium Pu242 fission chambers, the inventors of the present patent application have observed that, in an irradiation reactor, the contribution of the gamma radiation falls from approximately 50% in current mode to approximately 0.6% in fluctuation mode. This is the reason why the inventors of the present patent application have chosen, preferentially, to develop electronics for digital processing of the signal to operate the chamber in fluctuation mode.

The electrical signal originating from the fission chamber is, after amplification and conditioning (preamplifier PA), digitised using the analog-digital converter CAN. The computation of the variance is then performed digitally, using a digital electronic circuit, for example of the FPGA type (FPGA for "Field Programmable Gate Array") or using a processor.

The CAN circuit samples, with a sampling frequency Fe=1/dt, the analog signal Va(t) as a digital signal VR($t_n$), with $t_n$=n·dt. The frequency Fe is, for example, equal to 1 MHz. The digital signal Vn($t_n$) is then processed by the digital processor VAR. The processor VAR computes the digital variance VR($t_n$) over a rolling timeframe of N samples, of a duration $T_h$ such that:

$$T_h = Ndt$$

The duration $T_h$ is equal, for example, to 100 ms. This gives the following:

$$VR(t_n) = \frac{1}{N-1} \sum_{k=0}^{N-1} Vn(t_n - k \cdot dt)^2$$

The digital variance VR($t_n$) can possibly be decimated (up to a factor N), since its bandwidth is less than that of the original signal Vn($t_n$). The measuring sequence thus produces a digital value of the variance proportional to the flow of incident neutrons, for example every 100 ms.

Figure 6:
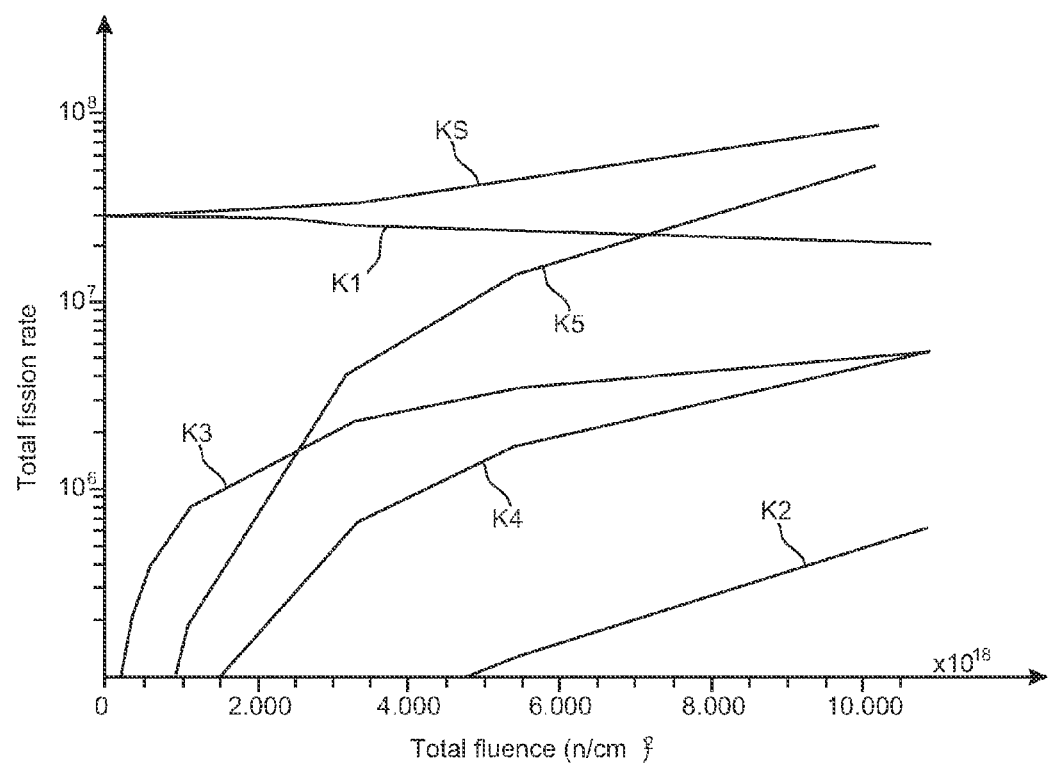
FIG. 6 illustrates the contribution to the measuring signal originating from a Pu242 plutonium fission chamber of the various isotopes formed by successive transmutations (thermal captures)

The measurement of the thermal neutrons is made using a collectron (SPND), for example a rhodium collectron, or using a uranium U235 fission chamber, which is also preferentially operated in fluctuation mode (rejection of the gamma radiation). The measurement of the thermal neutrons is used for evaluating the evolution of the isotopic composition of the deposit of the fission chamber during flow. Indeed, under the effect of an intense thermal flow fissile isotopes are formed by successive transformations of the plutonium Pu242, making the plutonium Pu242 fission chamber increasingly sensitive to the thermal neutrons. FIG. 6 illustrates, as a non-restrictive example for thermal and fast flows of 1E15 n/cm²/s, the total fission rate (graph KS in FIG. 6) and the contribution to the total fission rate of the various isotopes formed by successive transmutations, namely plutonium Pu242 (graph K1 in FIG. 6), plutonium Pu241 (graph K2 in FIG. 6), americium AM243 (graph K3 in FIG. 6), curium CM244 (graph K4 in FIG. 6) and curium CM245 (graph K5 in FIG. 6). As can be clearly seen, the most problematic of the fissile isotopes which appear by successive transmutations is Cm245 (graph K5), from a thermal fluence of the order of $10^{21}$ n/cm².

In the context of the invention the electronic conditioning and processing circuit C2 (not represented in the figures) is advantageously identical to the circuit C1 if the DNT detector is a U235 fission chamber. If the DNT thermal detector is a collectron, circuit C2 is a digital current-voltage conversion circuit. This function may, for example, be provided by a digital voltmeter which measures the drop in voltage at the terminals of a resistor (for example of 10 kΩ at 1%) in which the current generated by the collectron flows.

BIBLIOGRAPHICAL REFERENCES

[1] D. Beretz et al: "French PWR Vessel Surveillance Program Dosimetry Experience Feedback from More than a Hundred Capsules", Reactor Dosimetry ASTM STP 1398, West Conshohocken, Pa., 2000

[2] G. Bignan and J-C. Guyard: "Chambre à fission subminiature avec passage étanche" [Subminiature Fission Chamber with Airtight Passage], French patent, registration No 9414293, publication No 2727526.

[3] Y. Kashchuk et al: "Monitoring the Fast Neutron Flux Density and Fluence in a RBMK Core Using a Threshold Fission Chamber in a Screen-Absorber". Atomic Energy, Vol. 98, 4, (2005), 249.

[4] G. F. Knoll: "Radiation Detection and Measurement" 3rd Edition, John Wiley & Sons, 1999.

[5] A. Tsilanizara et al. DARWIN: "An evolution code system for a large range of applications". J. Nucl. Sci. Technol. 37 (2000) 845.

[6] L. Vermeeren: "Absolute on-line in-pile measurement of neutron fluxes using self-powered neutron detectors", 5$^{th}$ International Topical Meeting on Research Reactor Fuel Management, Org. European Nuclear Society, Aix-la-Chapelle, Germany, 1-3 Apr. 2001.

The invention claimed is:

1. A device for online measurement of a flow of fast and epithermal neutrons $\phi_1(t_n)$ at instants $t_n$ over an energy interval $[E_{min}, E_{max}]$, comprising:
   a fast neutron detector (DNR) containing material suitable for detecting principally fast neutrons;
   a thermal neutron detector (DNT) containing material suitable for detecting principally thermal neutrons;
   a first electronic circuit (C1) which delivers, at instants $t_n$, a digital signal $VR(t_n)$ from a detection signal delivered by the fast neutron detector;
   a second electronic circuit (C2) which delivers, at instants $t_n$, a second digital signal $VT(t_n)$ from a detection signal delivered by the thermal neutron detector;
   means (PMM, CE) able to determine, at instants $t_n$, the isotopic composition of the fast neutron detecting material and the isotopic composition of the thermal neutron detecting material;
   means (PMM, CE) able to determine, at instants $t_n$, from the said isotopic compositions, the progressive sensitivity to the fast neutrons $I_{11}(t_n)$ of the fast neutron detector, the progressive sensitivity to the thermal neutrons $I_{12}(t_n)$ of the fast neutron detector, the progressive sensitivity to the thermal neutrons $I_{21}(t_n)$ of the thermal neutron detector and the progressive sensitivity to the fast neutrons $I_{22}(t_n)$ of the thermal neutrons detector,
   means for computation (CALC), at instants $t_n$, of the flow of fast and epithermal neutrons $\phi 1(t_n)$ and of a flow of thermal neutrons $\phi 2(t_n)$, from the following system of equations:

$$VR(t_n)=KR \times I_{11}(t_n) \times \phi 1(t_n) + KR \times I_{12}(t_n) \times \phi 2(t_n), \text{ and}$$

$$VT(t_n)=KT \times I_{21}(t_n) \times \phi 1(t_n) + KT \times I_{22}(t_n) \times \phi 2(t_n)$$

where KR and KT are, respectively, a coefficient for calibration of the fast neutron detector and a coefficient for calibration of the thermal neutron detector.

2. A measuring device according to claim 1, characterised in that it also includes means (CALC) for computing a full neutron flow $\phi(t_n, E)$ using the following equation:

$$\phi(t_n,E)=\phi_1(t_n) \cdot f_1(E) + \phi_2(t_n) \cdot f_2(E,\theta), \text{ where}$$

$$f_1(E)=f_{fiss}(E) + \alpha f_{epi}(E), \text{ and}$$

$$f_2(E,\theta)=f_{mxw}(E,\theta),$$

where $f_{fiss}(E)$ is a fission component of the flow of neutrons, where $f_{epi}(E)$ is an epithermal component of the flow of neutrons, where $f_{mxw}(E, \theta)$ is a Maxwellian component of the flow of neutrons, and where $\alpha$ is a coefficient of proportionality between the epithermal component of the flow of neutrons and the fission component of the flow of neutrons.

3. A device according to claim 1, characterised in that it also includes means (CALC) for computing, over the interval $[E_{min}, E_{max}]$, $N_r$ integrated results at instants $t_n$, where $N_r$ is an integer greater than or equal to 1, and where an integrated result of order k (k=1, 2, ..., $N_r$) is given by the following equation:

$$R_k(t_n)=m_{k1} \cdot \phi_1(t_n) + m_{k2}(\theta) \cdot \phi_2(t_n)$$

with $$m_{k1} = \int_{E_{min}}^{E_{max}} f_1(E) \cdot Y_k(E) dE, \text{ and}$$

$$m_{k2} = \int_{E_{min}}^{E_{max}} f_2(E, \theta_0) \cdot Y_k(E) dE, \text{ where}$$

$$f_1(E)=f_{fiss}(E)+\alpha f_{epi}(E), \text{ and}$$

$$f_2(E,\theta)=f_{mxw}(E,\theta),$$

where $f_{fiss}(E)$ is a fission component of the flow of neutrons, where $f_{epi}(E)$ is an epithermal component of the flow of neutrons, where $f_{mxw}(E, \theta)$ is a Maxwellian component of the flow of neutrons, and where $\alpha$ is a coefficient of proportionality between the epithermal component of the flow of neutrons and the fission component of the flow of neutrons, and where
   $Y_k(E)$ is a response function which characterises the complete result of order k.

4. A measuring device according to claim 3, in which the response function $Y_k(E)$ is an identification function of an energy band of interest $[E_a, E_b]$ which coincides with the interval $[E_{min}, E_{max}]$ or which is included in the interval $[E_{min}, E_{max}]$ such that:

$$Y_k(E)=1 \text{ if } E_a<E<E_b, \text{ and}$$

$$Y_k(E)=0 \text{ otherwise}$$

such that $R_k(t_n)$ is the flow of neutrons the energy of which is between $E_a$ and $E_b$, namely:

$$R_k(t_n) = \int_{E_a}^{E_b} \varphi(t_n, E) dE.$$

5. A measuring device according to claim 3, in which the response function $Y_k(E)$ is an effective macroscopic section of reaction $\Sigma_r(E)$ such that:

$$\Sigma_r(E) = \sum_i N_i' \cdot \sigma_i^r(E),$$

where
   $N_i'$ is a number of atoms of an isotope i present in a medium and $\sigma_i^r(E)$ is an effective microscopic section of isotope i with regards to a reaction r in the medium, such that $R_k(t_n)$ is a rate of reaction r in the medium, namely:

$$R_k(t_n) = \int_{E_{min}}^{E_{max}} \varphi(t_n, E) \sum_r (E) dE.$$

6. A measuring device according to claim 5, in which the reaction r is a fission or capture or diffusion or damage reaction.

7. A measuring device according to claim 1 in which, since the fast neutron detector and the thermal neutron detector are fission chambers, the progressive sensitivities $I_{11}(t_n)$, $I_{12}(t_n)$, $I_{21}(t_n)$ and $I_{22}(t_n)$ are written respectively:

$$I_{11}(t_n) = \sum_i N_i(t_n) \int_{E_{min}}^{E_{max}} f_1(E)\sigma_1^f(E)dE$$

$$I_{12}(t_n) = \sum_i N_i(t_n) \int_{E_{min}}^{E_{max}} f_2(E,\theta)\sigma_i^f(E)dE$$

where $N_i(t_n)$ is the isotopic composition at instant $t_n$ of an isotope i of the material suitable for detecting principally fast neutrons, and $\sigma_i^f(E)$ is the effective section of isotope i; and $$I_{21}(t_n) = \sum_j N_j(t_n) \int_{E_{min}}^{E_{max}} f_1(E)\sigma_j^f(E)dE$$

$$I_{22}(t_n) = \sum_j N_j(t_n) \int_{E_{min}}^{E_{max}} f_2(E,\theta)\sigma_j^f(E)dE$$

where $N_j(t_n)$ is the isotopic composition at instant $t_n$ of an isotope j of the material suitable for detecting principally thermal neutrons, and $\sigma_j^f(E)$ is the effective section of isotope j.

8. A measuring device according to claim 7, in which the thermal neutron detector is a fission chamber containing Uranium U235.

9. A measuring device according to claim 7, in which the fast neutron detector is a fission chamber with a threshold fissile deposit.

10. A measuring device according to claim 9, in which the fission chamber is a fission chamber containing plutonium Pu242 pure to at least 99.5%.

11. A measuring device according to claim 10, in which the fission chamber containing plutonium Pu242 pure to at least 99.5% includes:
- an enclosure (1, 20) able to contain a pressurised detection gas, and the walls of which allow the neutrons to traverse them,
- a first and a second electrode (21, 26, 120), electrically insulated from one another, between which a voltage may be applied,
- a fissile material, including plutonium 242 pure to at least 99.5% atomic, deposited on at least one of the two electrodes, and
- a detection gas, included in the pressurised enclosure, ionisable by fission products.

12. A measuring device according to claim 11, in which either one of the first and second electrodes forms part of the enclosure, and where the electrodes are then called the outer electrode (1) and the inner electrode (2).

13. A measuring device according to claim 12, in which the fissile material (3) is deposited on a wall of the inner electrode.

14. A measuring device according to claim 11, in which the detection gas is argon to which 4% nitrogen is added.

15. A measuring device according to claim 9, in which the fast neutron detector is a fission chamber containing Neptunium Np237, or Uranium U238, or Thorium Th232.

16. A measuring device according to claim 1, in which, since the fast neutron detector is a fission detector and the thermal neutron detector is a collectron, the progressive sensitivities $I_{11}(t_n)$, $I_{12}(t_n)$, $I_{21}(t_n)$ and $I_{22}(t_n)$ are written respectively:

$$I_{11}(t_n) = \sum_i N_i(t_n) \int_{E_{min}}^{E_{max}} f_1(E)\sigma_1^f(E)dE \text{ and}$$

$$I_{12}(t_n) = \sum_i N_i(t_n) \int_{E_{min}}^{E_{max}} f_2(E,\theta)\sigma_i^f(E)dE$$

where $N_i(t_n)$ is the isotopic composition at instant $t_n$ of an isotope i of the material suitable for detecting principally fast neutrons, and $\sigma_i^f(E)$ is the effective section of isotope i; and $$I_{21}(t_n) = \bigcup[\Psi(t_n)] \int_{E_{min}}^{E_{max}} f_1(E)s_{Rh}(E)dE$$

$$I_{22}(t_n) = \bigcup[\Psi(t_n)] \int_{E_{min}}^{E_{max}} f_2(E,\theta)s_{Rh}(E)dE$$

where $\cup[\Psi(t_n)]$ is a wear and tear function of the collection tabulated as a function of the thermal fluence at instant $t_n \cup[\Psi(t_n)]$ of the material suitable for detecting principally thermal neutrons, and $S_{Rh}(E)$ is the sensitivity of the collectron.

17. A measuring device according to claim 16 in which the thermal neutron detector is a Rhodium or Vanadium or Silver collectron.

18. A measuring device according to claim 1, in which the first electronic circuit (C1) includes a digital variance computation processor which delivers the digital signal $VR(t_n)$ in the form of a digital variance of the signal delivered by the fast neutron detector.

19. A measuring device according to claim 1, in which the second electronic circuit (C2) includes a digital variance computation processor which delivers the digital signal $VT(t_n)$ in the form of a digital variance of the signal delivered by the thermal neutron detector.

20. A measuring device according to claim 1, in which the second electronic circuit (C2) is a digital current-voltage conversion circuit.

* * * * *